D. Philips,
Portable Fence,
Nº 90,300.
Patented May. 18. 1869.
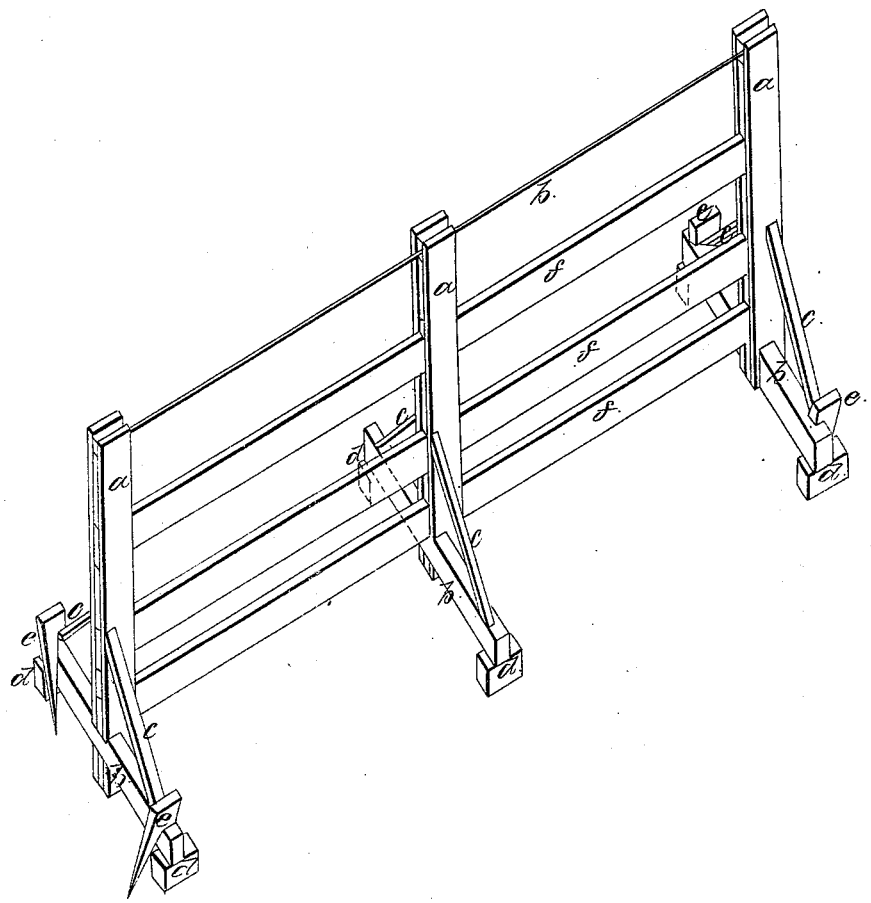
Witnesses:
W. L. Carroll
J. M. Daniels
Inventor:
David Philip

United States Patent Office.

DAVID PHILIPS, OF CORDOVA, ILLINOIS.

Letters Patent No. 90,300, dated May 18, 1869.

IMPROVEMENT IN PORTABLE FENCE.

The Schedule referred to in these Letters Patent and making part of the same.

*To all whom it may concern:*

Be it known that I, DAVID PHILIPS, of Cordova, in the county of Rock Island, and State of Illinois, have invented certain new and useful Improvements in Portable Fence; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

I construct my fence by first making the post, which is done by sawing up some fencing-boards, of six inches in width, to the length desired for height of fence; then sawing some short pieces of the same materials, and of lengths corresponding to the distances apart which it may be desired to put the boards or bars in posts for fence; but said short pieces, or blocks, are to be cut, if so desired, one-half inch longer than the distances apart for boards, so that when nailed together with other longer boards, to form a post, the distances between blocks, for forming, as it were, a mortise through post, may be one-half inch less than the width of fence-boards, thus requiring the boards to have a shoulder, to prevent them from going more than three inches into posts from either side; or it may be made so that the mortise shall be equal to the whole width of fencing-boards.

When two pieces of boards, as above, of length desired for posts, are strongly nailed together with the shorter pieces, or blocks, described, between them, the post is made.

Now, I take a piece of timber, about two by four inches square, and of three or four feet in length, as may be desired, and frame that and lower end of post so as to interlock together, and secured also by nails; or I take a piece about three by four, and interlock in such a way as to leave a portion of the wood of bottom end of post on each side of cross-bar, by cutting up into post from the bottom end, of sufficient width to take in the cross-bar.

The cross-bar is, in either mode of construction, slightly notched or cut out, so as to clasp the sides of posts, and thus help to make it firmly secured together at the bottom end.

Now I put braces from ends of cross-bars, above described, to posts, securing them at each end in suitable notches; lay blocks upon the ground for cross-bars to rest upon, to prevent any part of posts coming in contact with earth; then take stakes, prepared for the purpose, with a notch or hook, and drive into earth at each end of cross-bar, and touching lower end of braces; then put the common fence-boards, properly prepared, in their places, and the fence is complete.

Draw the stakes from the earth, take out the fence-boards, and the fence can be moved to any other place, and set up as before, at pleasure.

A wire, such as common fence-wire, may be used instead or in place of the top board, if desired, and can be tightened and secured wherever necessary.

In the accompanying drawing—

$a\ a$ are the posts;
$b\ b$, the cross-bars;
$c\ c$, braces;
$d\ d$, blocks, on which cross-bars $b\ b$ rest;
$e\ e$ are stakes, securing cross-bars $b\ b$ in place;
$f\ f$, fence-boards, or bars; and
$g$ represents a wire, to be used at the top, if desired.

Claim.

What I claim as my invention, and desire to secure by Letters Patent, is—

The portable fence, consisting of the posts $a$, made of two pieces of board, nailed together, with the blocks between them, in combination with the bed-pieces $b$, braces $c$, and boards $f$, when said parts are united and arranged as shown and described.

DAVID PHILIPS.

Witnesses:
W. L. CARROLL,
J. M. DANIELS.